United States Patent
Wheeler et al.

(10) Patent No.: US 7,041,031 B2
(45) Date of Patent: May 9, 2006

(54) CALCULATION OF AUTOMATED FRICTION CLUTCH URGE TORQUE ON GRADES

(75) Inventors: Robert Stanley Wheeler, Preston (GB); Alfred John Richardson, Knutsford (GB); Martin Fowler, LYMM Cheshire (GB); Keith Wright, Preston (GB)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/333,163

(22) PCT Filed: Jul. 24, 2001

(86) PCT No.: PCT/IB01/01323

§ 371 (c)(1),
(2), (4) Date: Sep. 2, 2003

(87) PCT Pub. No.: WO02/08011

PCT Pub. Date: Jan. 31, 2002

(65) Prior Publication Data

US 2004/0033861 A1    Feb. 19, 2004

(30) Foreign Application Priority Data

Jul. 26, 2000  (GB) ................. 0018186.7

(51) Int. Cl.
*B60K 41/04* (2006.01)
*B60K 41/02* (2006.01)

(52) U.S. Cl. ............ 477/110; 477/175; 477/900; 477/901

(58) Field of Classification Search ............ 477/97, 477/107, 110, 174–5, 180–1, 900–1
See application file for complete search history.

(56) References Cited

U.S. PATENT DOCUMENTS

| | | | |
|---|---|---|---|
| 4,662,491 A | | 5/1987 | Takefuta et al. |
| 5,549,525 A | * | 8/1996 | Wendel ............ 477/901 |
| 6,071,211 A | * | 6/2000 | Liu et al. ............ 477/175 |
| 6,173,226 B1 | * | 1/2001 | Yoshida et al. ........ 477/110 |
| 6,346,064 B1 | * | 2/2002 | Hada et al. ........... 477/171 |
| 6,445,992 B1 | * | 9/2002 | Wheeler et al. ....... 477/180 |
| 6,636,795 B1 | * | 10/2003 | Morscheck ............ 477/110 |

FOREIGN PATENT DOCUMENTS

| | | |
|---|---|---|
| DE | 19841917 A1 | 12/1999 |
| DE | 19838972 A1 | 3/2000 |
| EP | 0375162 B1 | 1/1995 |

OTHER PUBLICATIONS

Derwent English Abstracts for DE19838972A1 and DE19841917A1.

* cited by examiner

*Primary Examiner*—Roger Pang
(74) *Attorney, Agent, or Firm*—Rader, Fishman & Grauer PLLC

(57) ABSTRACT

The invention relates to a method for calculating a modification to the predetermined amount of torque needed to provide an urge to move sensation for a vehicle, the modification to take account of the weight at which and gradient on which the vehicle is operating and then commanding the engine to generate said modified torque and to transmit the modified urge torque to a clutch device to provide the urge to move according to the current operating conditions.

12 Claims, 2 Drawing Sheets

CALCULATION OF AUTOMATED FRICTION CLUTCH URGE TORQUE ON GRADES

FIELD OF INVENTION

This invention relates to improvements in vehicle transmissions, in particular to vehicles fitted with automated transmissions and clutch systems.

BACKGROUND

When driving a vehicle fitted with a change gear ratio transmission connected to an engine by a torque converter the operation of the transmission is characterised by the slip and torque multiplication available from the torque converter section. The "feel" of the transmission is recognisable by an "urge to move" when the vehicle is stationary. This urge to move is caused by the stall torque of the torque converter at engine idle speed. On an uphill incline it can prevent the vehicle moving backward when the vehicle is stationary and the driver moves his foot from the brake to the accelerator pedal.

An Automated Mechanical Transmission (AMT) includes a change gear transmission and normally also includes a Central Processing Unit (CPU) which controls the selection of gear and the operation of the gear selector mechanism. Normally, an AMT is coupled to a conventional friction clutch, rather than a known hydraulic torque converter. In more advanced versions of the AMT, the clutch control is also automated and the driver has only two pedals in the cab, a throttle control or accelerator pedal and a brake pedal. Normal or manually operated clutches control the clutch and do not present the driver with an "urge to move" feeling. When stationary, the clutch is normally completely disengaged in order to minimise the clutch wear and avoid excessive heat dissipation that would arise from a continually slipping clutch. In these conditions there is nothing to prevent a vehicle fitted with an AMT rolling forwards or backwards if the driver has not applied either the parking brake or service brake using the pedal.

In a commercial vehicle having 6, 9 or even more forward speed ratios there is the possibility of selecting a gear other than first gear for engagement. Commonly in such vehicles with a 6 speed transmission the starting gear will be $2^{nd}$ or $3^{rd}$. For heavier vehicles with 12 or 16 speed transmissions the starting gear will be $3^{rd}$ or $5^{th}$ and occasionally $7^{th}$ if the vehicle is unladen and setting off in a downhill direction. With the choice of a number of start ratios it is possible to select a ratio which can minimise the clutch slip and heat generation during the launch phase.

It is desirable to present the driver with an indication the vehicle is ready for launch and can move off quickly when commanded to do so. In this specification the expression "urge to move" is intended to mean that a vehicle is ready to move and the drive line slack has been taken up and there is a sensation given to the driver that the vehicle will move off if the brakes are released. It does not necessarily mean that the vehicle will creep forward (or backwards), as would tend to be the case, for a vehicle fitted with a conventional torque converter, but it is intended to indicate that sufficient torque is being transmitted through the vehicle drive-line to take up any slack in the drive-line components and that the vehicle will not just roll in a downhill direction if it is at rest on a gradient without a brake applied. The Urge Torque is the amount of torque required to give the urge to move feeling and make the vehicle feel as if it is ready to move off from rest. It is an empirically determined figure that will depend on the weight and type of vehicle. It can be qualitatively described as the amount of torque needed to provide the driver with the sensation that at least any slack in the drive-line has been partially taken up and the clutch engagement process has started and so the vehicle is ready to move off.

Allowing the partial engagement of the clutch to provide slip under zero speed conditions partially replicates the sensations of a torque converter type system and provides the urge to move feeling experienced with such systems. An automated clutch system can be programmed to transmit a greater amount of torque and so provide a limited amount of movement and so replicate the "creep" function. Alternatively, when a vehicle is on an uphill gradient it is desirable to provide a hill holding capability in which the vehicle can be held stationary by the engine running at or slightly above idle speed and slipping clutch without the need for application of an additional braking force. It is also clear that when a vehicle is laden the amount of torque required to prevent the vehicle rolling backwards is greater than that required when it is unladen or on a flat or level surface. Clearly, it is desirable to ensure enough torque is available to provide the urge to move in the particular circumstances which the vehicle minimise the amount of slip and therefore heat generated in order to maximise clutch life.

SUMMARY

According to the present invention there is provided an automated friction clutch adapted to be fitted to a vehicle and engageable to transfer power from an engine to a mechanical change gear transmission and a central processing unit for controlling operation of the clutch, and capable of sending command signals to the engine and transmission, a plurality of sensors, whose outputs are supplied as inputs to the central processing unit (CPU) for use in calculating the gradient on which the vehicle is operating and the weight of the vehicle, the calculated values of gradient and vehicle weight being used by the central processing unit to calculate a value of modified urge torque and to provide command signals to the engine to deliver to the clutch a torque output equal to the modified urge torque and to a clutch operator to engage to said clutch to the transmit the modified urge torque.

BRIEF DESCRIPTION OF THE DRAWINGS

The invention will now be described with reference to the accompanying drawings in which.

DETAILED DESCRIPTION

Figure 1:
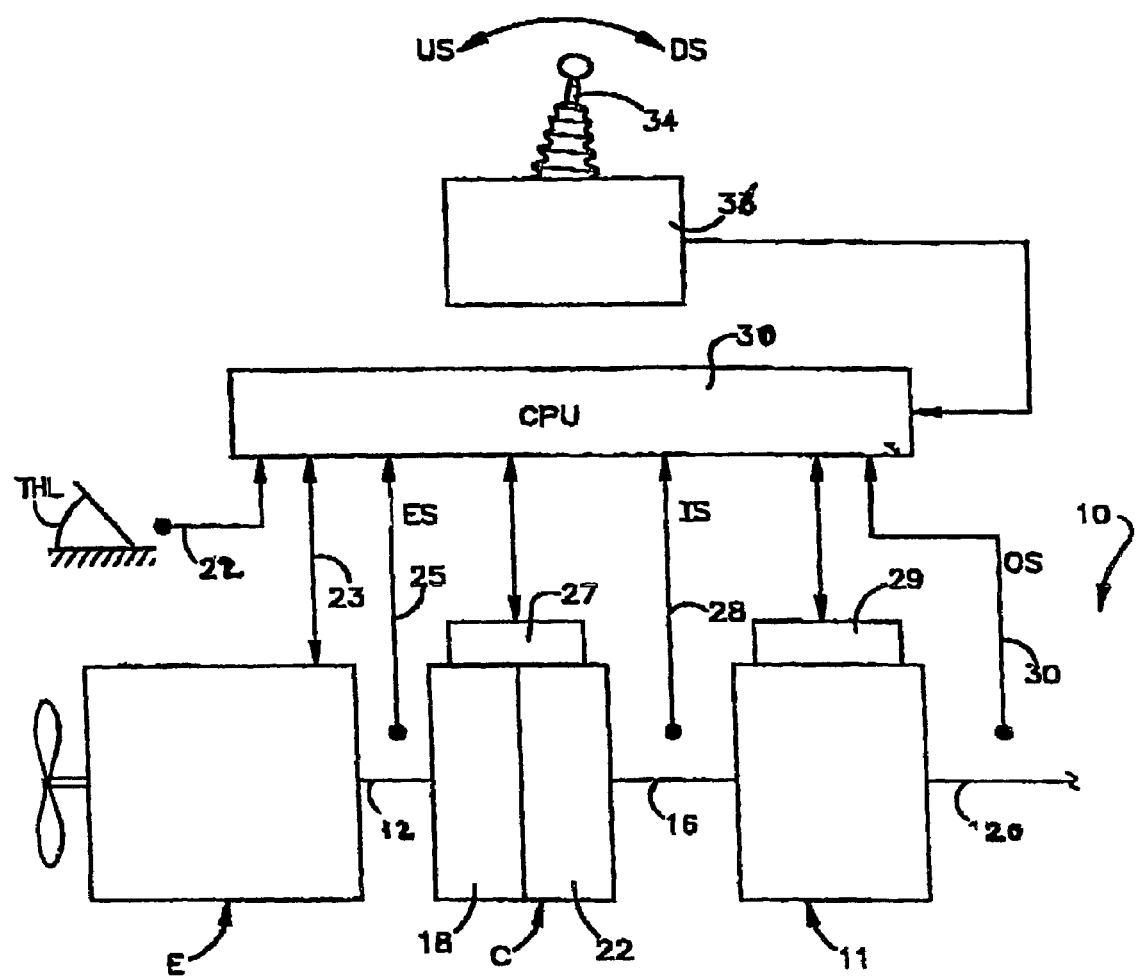
FIG. 1 shows a general schematic view of a transmission system.

FIG. 1 shows a transmission system 10 includes an engine E having an output shaft 12 connected to a clutch C, which is in turn connectable to an input shaft 16 of a change gear transmission 11. The transmission 11 is has an output shaft 20 connected to the drive wheels (not shown) of the vehicle.

The transmission system is controlled by a central processing unit (CPU) 30, which preferably is a single processing unit, but alternatively could be a plurality of processing units distributed processing units. In such circumstances the processing units may be located on the transmission, in the vehicle cab, on the engine, on the chassis or any combination of these. The transmission will normally have a number of modes in which it can operate, including manual and automatic. There may be additional functions to enable the shift points to be adjusted to suit the prevailing conditions.

The engine power demanded by a driver is signaled by THL 22, whose output signal is sent to the CPU 30. The CPU 30 then communicates the demanded power as an output signal to the engine E along link 23. The driver will also be provided with a gear ratio selector lever 34, usable to select a transmission ratio or to override the selection made by the CPU if the transmission is in automatic mode. Operation of the clutch is controlled by the CPU whose control signals are sent to a clutch operator 27. Operation of the transmission will be by known means not forming a part of this invention. The gear ratio selector lever 34 operates a set of contacts in unit 36 to provide an output signal to the CPU 30. The selector lever 34 is used by the driver to select a gear ratio or to override the ratio selected by the transmission CPU. Further inputs to the CPU are from sensors ES, IS and OS which measure engine speed, transmission input shaft speed and transmission output shaft speed respectively. Output shaft speed can be used to determine vehicle speed in known manner. The transmission controller 29 will also supply information about the currently engaged gear ratio (GR). From this information, it is possible to calculate GVW in known manner. Another source of GVW information could be the SAE J1939 data-link or "CAN bus" system if one of these is fitted to the vehicle.

Figure 2:
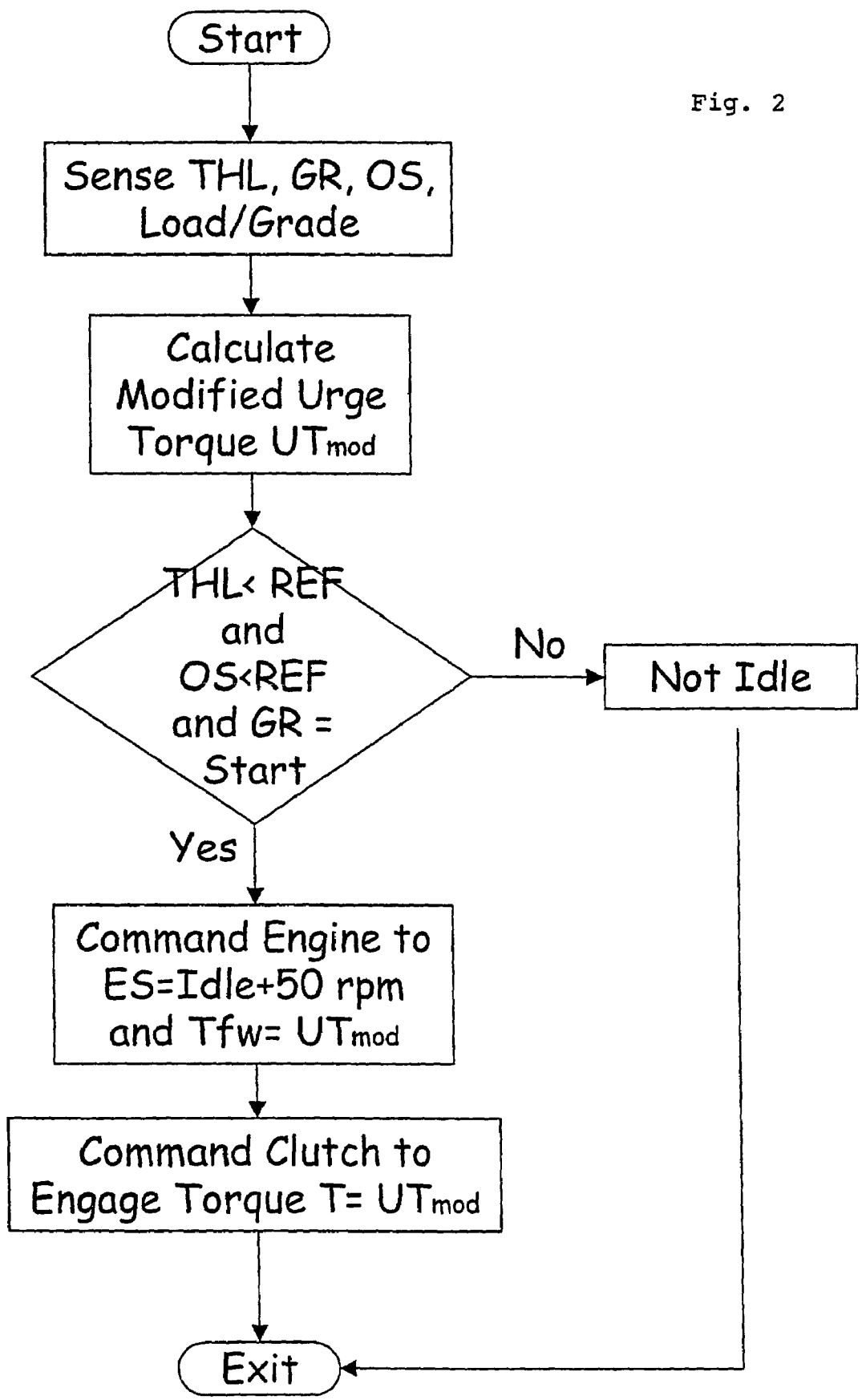
FIG. 2 shows a flow chart for the operation of a logic sequence for operation of a transmission in the mode described.

FIG. 2 shows a flow chart sequence for implementation of the present invention. Values of throttle position THL, output shaft speed OS, engine speed ES and input shaft speed IS are taken from the sensors 22, 25, 28, and 30 and supplied to the CPU which processes the information to determine if the vehicle is on an up grade, level or a down grade and also to determine the vehicle weight The information on grade and weight is then used to calculate the amount of torque (modified urge torque) needed to maintain the vehicle in a steady state in the particular circumstances. Urge torque is normally defined to be a specific value of torque which is commanded from the engine to provide the driver with a feeling of the urge to move, that is to say the drive line slack has been taken up and the vehicle is ready for launch. It is normally a specific value of torque for a particular type of vehicle and has been determined empirically. A medium duty vehicle operating up to say about 26 tonnes, (approx 50,000 lbs), an urge torque of about 61 Nm (approx 45 ftlbs) has been determined to be a good value. Factors affecting the precise value of urge torque are those such as vehicle configuration, and whether it is preferred for the vehicle launch smoothly and with a minimum of delay or whether a slower response time is acceptable.

The CPU will calculate the value of modified urge torque, $UT_{MOD}$, required to hold the vehicle in the particular circumstances. If the vehicle is on a level surface the urge torque will be equal to the normally stored and predetermined value. If the vehicle is facing uphill, then more torque will be needed to hold the vehicle in position without it rolling backwards.

Whilst the normal urge to move torque will slow the rate at which the vehicle rolls backwards compared to a similar set of circumstances when the vehicle is on the level, it is desirable, if possible, to provide in addition, a hill holding capability. In providing a full hill holding capability a number of important criteria need to be considered, primarily the thermal performance of the clutch and its ability to dissipate the heat generated during the hill holding process. Clearly, a small capacity clutch will have a lower thermal capacity (and torque transmitting capacity) than a comparable larger unit, and for similar sized clutches, wet clutches fitted with coolers have more capacity than ordinary wet clutches, which in turn have more capacity than dry clutches. In determining whether a system can have a full hill holding capacity these factors have to be considered. It will be important also to incorporate thermal warning and thermal protection systems, the design and details of which fall outside the scope of this invention.

If the vehicle is on a downhill gradient, then it will be desirable to reduce the modified urge torque so that it is less than the urge torque. The reduced value has a number of advantages, one of which is to reduce clutch slip and clutch wear. Also, if the vehicle is facing downhill, it is desirable to have the urge to move feeling, but with a reduced strength so that the vehicle is not accelerated down the hill, unless the driver wishes or commands such acceleration by pressing the throttle.

It can thus be seen that the modified urge torque is not always going to be greater than the pre-determined urge torque, but in the downhill condition it could be less. Although its value may be low it cannot be negative, and will not be zero if the slack in the drive train is to be taken up.

In order for the engine to generate the required torque it is necessary to raise the engine speed above idle level, primarily to ensure the control of the engine rests with the transmission CPU rather than the engine CPU. An increase above engine idle speed of between 50 and 100 rpm is needed depending upon the engine, but normally about 50 rpm is sufficient to achieve the desired effect.

The CPU of an automated transmission can normally calculate from input sensor information, such as transmission input shaft speed, output shaft speed, gear ratio and vehicle acceleration/deceleration the gradient of the road and the gross vehicle weight (GVW). Alternatively, such information may be available from an SAE J1939 data link or CAN-bus if it is fitted to the vehicle. Using the values of gradient and GVW, and with information about the torque characteristics of the engine it is possible to calculate the torque required to hold the vehicle in position on an uphill gradient The CPU also receives an input of gear ratio engaged which is used to determine if the transmission is in one of the start gears. Sensed throttle position (THL) provides an input 22 which is compared against a pre-determined reference value $THL_{REF}$ and the output shaft speed is also compared against a pre-determined reference value $OS_{REF}$. If the throttle setting is greater than the pre-determined reference value, and if output shaft speed is greater than the predetermined reference value, then the CPU will determine the vehicle is not at rest or idle and so discontinue the routine and exit the process.

If the throttle setting is less than the pre-determined reference value, and if output shaft speed is less than a pre-determined reference value and the vehicle is in one of the permitted start gear ratios, then the process will continue. Providing the test conditions are satisfied the CPU can command that the engine speed be raised above idle speed to provide the modified urge torque. Once the engine is generating the modified urge torque the CPU commands the clutch controller 27 to start engaging the clutch to transmit the modified urge torque. The routine then ends.

This routine can be used to optimise the amount of clutch slip for all conditions. The benefits of this system are a consistent feel to the "urge to move" independent of the load or grade. By generating only the required amount of torque it is possible to keep the clutch slip to the minimum required whilst still presenting the driver with the "urge to move" feeling. Minimising the amount of torque generated by the engine will minimise the amount of torque to be transmitted by the clutch and so reduce the amount of wear. This has the advantage of reducing the amount of heat dissipated in the clutch. This enables the thermal capacity of the clutch to be used more efficiently. In the case when the vehicle is on the level or an up incline, this could mean a longer period of clutch slip, and in the hill holding mode a capability to hold the vehicle on a steeper gradient. These benefits can be used to maximise the clutch life or improve the capability of the system under these difficult conditions.

The invention claimed is:

1. An automated friction clutch (C), adapted to be fitted to a vehicle and engageable to transfer power from an engine (E) to a mechanical change gear transmission (11) and a central processing unit (CPU) for controlling operation of the clutch, and capable of sending command signals to the engine (E) and transmission, a plurality of sensors (22, 25, 28, 30) whose outputs are supplied as inputs to the central processing unit (CPU) for use in calculating a gradient on which the vehicle is operating and a weight of the vehicle (GVW), the calculated values of gradient and vehicle weight being used by the central processing unit (CPU) to calculate a value of modified urge torque ($UT_{MOD}$) and to provide command signals to the engine (E) to deliver to the clutch (C) a torque output equal to the modified urge torque ($UT_{MOD}$) and to a clutch operator (27) to engage to said clutch (C) to the transmit the modified urge torque ($UT_{MOD}$).

2. A system according to claim 1 in which the modified urge torque is calculated to be equal to that required to maintain the vehicle in a stationary position on a level or an up gradient.

3. A system according to claim 1 in which the modified urge torque is equal to or more than the urge torque if the vehicle is on a level or an up gradient.

4. An automated friction clutch (C), adapted to be fitted to a vehicle and engageable to transfer power from an engine (E) to a mechanical change gear transmission (11) and a central processing unit (CPU) for controlling operation of the clutch, and capable of sending command signals to the engine (E) and transmission, a plurality of sensors (22, 25, 28, 30) whose outputs are supplied as inputs to the central processing unit (CPU) for use in calculating a gradient on which the vehicle is operating and a weight of the vehicle (GVW), the calculated values of gradient and vehicle weight being used by the central processing unit (CPU) to calculate a value of modified urge torque ($UT_{MOD}$) and to provide command signals to the engine (E) to deliver to the clutch (C) a torque output equal to the modified urge torque ($UT_{MOD}$) and to a clutch operator (27) to engage to said clutch (C) to the transmit the modified urge torque ($UT_{MOD}$); whereby the modified urge torque is less than the urge torque if the vehicle is on a down gradient.

5. A method of controlling an automated friction clutch system coupled between an engine (E) controlled by a throttle and a mechanical change gear transmission (11), said clutch system connected to a central processing unit (CPU), and in which the CPU: i) receives an input of transmission gear ratio engaged (GR), ii) determines if the gear ratio engaged is a start gear, iii) receives a sensed throttle position (THL) input (22) from a throttle position sensor which senses throttle position of said engine E, iv) compares sensed throttle position (THL) against a pre-determined reference value ($THL_{REF}$) and v) compares transmission output shaft speed (OS) against a pre-determined reference value ($OS_{REF}$), and if the transmission is in one of the allowed start gear ratios, and if the throttle setting (THL) is less than the pre-determined reference value ($THL_{REF}$), and if output shaft speed (OS) is less than a pre-determined reference value ($OS_{REF}$), then calculates a value for a modified urge torque ($UT_{MOD}$) and commands that the engine speed be raised above engine idle speed to provide modified urge torque ($UT_{MOD}$) and commands a clutch operator (27) to deliver the modified urge torque to the transmission (11).

6. A method according to claim 5 in which the modified urge torque is calculated to be equal to that required to maintain the vehicle in a stationary position on a level or an up gradient.

7. A method according to claim 5 in which the modified urge torque is equal to or more than the urge torque if the vehicle is on a level or an up gradient.

8. A method of controlling an automated friction clutch system coupled between an engine (E) controlled by a throttle and a mechanical change gear transmission (11), said clutch system connected to a central processing unit (CPU), and in which the CPU: i) receives an input of transmission gear ratio engaged (GR), ii) determines if the gear ratio engaged is a start gear, iii) receives a sensed throttle position (THL) input (22) from a throttle position sensor which senses throttle position of said engine E, iv) compares sensed throttle position (THL) against a pre-determined reference value ($THL_{REF}$) and v) compares transmission output shaft speed (OS) against a pre-determined reference value ($OS_{REF}$), and if the transmission is in one of the allowed start gear ratios, and if the throttle setting (THL) is less than the pre-determined reference value ($THL_{REF}$), and if output shaft speed (OS) is less than a pre-determined reference value ($OS_{REF}$), then calculates a value for a modified urge torque ($UT_{MOD}$) and commands that the engine speed be raised above engine idle speed to provide modified urge torque ($UT_{MOD}$) and commands a clutch operator (27) to deliver the modified urge torque to the transmission (11); whereby the modified urge torque is less than the urge torque if the vehicle is on a down gradient.

9. An automated clutch comprising:
   a mechanical change gear transmission;
   a central processing unit adapted to control operation of a clutch disposed within said transmission and capable of sending command signals to an engine and said transmission;
   a plurality of sensors whose outputs are supplied as inputs to said central processing for calculating a value of modified urge torque; and
   whereby said clutch delivers a torque output equal to said modified urge torque, and wherein the modified urge torque is calculated to be about equal to that required to maintain the vehicle in a stationary position on a level or an up gradient.

10. The automated clutch of claim 9, wherein the modified urge torque is less than the urge torque if the vehicle is on a down gradient.

11. A method of controlling an automated clutch system comprising the steps of:
- providing a mechanical change gear transmission;
- adapting a central processing unit to control operation of a clutch disposed within said transmission and capable of sending command signals to an engine and said transmission;
- calculating a value of modified urge torque by having a plurality of sensors whose outputs are used as inputs to said central processing; and
- delivering a torque output at said clutch equal to said modified urge torque, wherein said modified urge torque is calculated to be about equal to that required to maintain the vehicle in a stationary position on a level or an up gradient.

12. The method of controlling an automated clutch system 11, wherein said modified urge torque is less than the urge torque if the vehicle is on a down gradient.

* * * * *